(12) United States Patent
Takeda et al.

(10) Patent No.: US 7,247,803 B2
(45) Date of Patent: Jul. 24, 2007

(54) LOADED WEIGHT MEASUREMENT METHOD AND LOADED WEIGHT MEASUREMENT DEVICE FOR DUMP TRUCK

(75) Inventors: Shu Takeda, Tochigi (JP); Kazuo Matsuda, Tochigi (JP)

(73) Assignee: Komatsu Ltd., Tokyo (JP)

( * ) Notice: Subject to any disclaimer, the term of this patent is extended or adjusted under 35 U.S.C. 154(b) by 147 days.

(21) Appl. No.: 11/033,475

(22) Filed: Jan. 12, 2005

(65) Prior Publication Data

US 2005/0167165 A1 Aug. 4, 2005

(30) Foreign Application Priority Data

Jan. 15, 2004 (JP) .............................. 2004-007586

(51) Int. Cl.
*G01G 19/08* (2006.01)
(52) U.S. Cl. ...................... 177/137; 177/136; 298/1 R; 701/50; 702/174
(58) Field of Classification Search ................. 298/1 R, 298/17 R, 22 R; 177/136, 137, 138, 141, 177/209, 146, 147, 1, 208; 701/29, 50; 702/101, 702/174; 73/862.582, 862.584
See application file for complete search history.

(56) References Cited

U.S. PATENT DOCUMENTS 4,691,792 A * 9/1987 Shintani 5,376,760 A * 12/1994 Horsley
2005/0167164 A1 * 8/2005 Takeda

FOREIGN PATENT DOCUMENTS

JP 61-034425 A 2/1986

* cited by examiner

*Primary Examiner*—Stephen Gordon
(74) *Attorney, Agent, or Firm*—Westerman, Hattori, Daniels & Adrian, LLP.

(57) ABSTRACT

To measure the loaded weight of a dump truck, accurately and inexpensively. In a dump truck comprising a set of equalizer bars respectively provided rotatably on the left and right-hand sides of a vehicle body; first vehicle wheels supported respectively by way of first suspension devices on one side of each equalizer bar; second vehicle wheels supported respectively by way of second suspension devices on the other side of each equalizer bar; and third vehicle wheels provided respectively on the left and right-hand sides of the vehicle body separately from the equalizer bars, and being supported respectively by way of third suspension devices; a first load applied to the second suspension device is detected; a second load applied to the third suspension device is detected; the angle of inclination of the vehicle body is detected; and a loaded weight is calculated on the basis of the first and second loads, and the angle of inclination.

5 Claims, 14 Drawing Sheets

LOADED WEIGHT MEASUREMENT METHOD AND LOADED WEIGHT MEASUREMENT DEVICE FOR DUMP TRUCK

BACKGROUND OF THE INVENTION

1. Field of the Invention

The present invention relates to a loaded weight measurement method and loaded weight measurement device for a dump truck.

2. Description of the Related Art

A method is known in the prior art (Japanese Patent Laid-open No. 61-34425) in which the weight of cargo is measured by detecting the load applied respectively to the front wheels and the rear wheels of a dump truck and correcting these detected loads on the basis of the angle of inclination of the vehicle and the center of gravity of the vehicle.

According to the prior art technology described in Japanese Patent Laid-open No. 61-34425, it is possible to determine the weight of a cargo simply by detecting the loads applied respectively to the front wheels and rear wheels. However, this conventional technology can only be applied to a dump truck having respective left and right-hand pairs of wheels in the front and rear portions of the vehicle body. Therefore, it is difficult to apply directly to a dump truck having two pairs of wheels in either the front section or rear section, as in the case of an articulated dump truck, for instance.

For example, in the case of an articulated dump truck, respective left and right-hand pairs of front wheels, central wheels and rear wheels are provided. The weight of an articulated dump truck is supported in a divided fashion by the front wheels, the central wheels and the rear wheels. Therefore, in order to measure the weight of cargo loaded into the vessel of the truck accurately, it is necessary to measure the respective loads applied to the front wheels, central wheels and rear wheels.

Here, for example, if the front wheels and the rear wheels are supported respectively by suspension cylinders, and the central wheels are supported by springs, then it is difficult to detect the load applied to the central wheels, accurately. A method can be conceived in which the amount of compression of the springs supporting the central wheels is measured and the load is determined on the basis of this amount of compression. However, this method produces significant error in the measurement of the loaded weight. The relationship between the compression of the springs and the load varies due to the effects friction in the springs, and other factors.

Therefore, a method may be conceived in which the central wheels are also supported by suspension cylinders, instead of springs, the load applied to the central wheels being measured by means of pressure sensors provided in these suspension cylinders. However, suspension cylinders are expensive compared to springs, and since pressure sensors must also be provided, the manufacturing costs of the dump truck increase.

The aforementioned problems are not limited to the case of articulated dump trucks, and are also common to dump trucks which have two pairs of wheels supported on rotatable equalizer bars, in at least the front or rear portion of the vehicle body.

SUMMARY OF THE INVENTION

The present invention was devised with the foregoing problems in view, an object thereof being to provide a loaded weight measurement method and a loaded weight measurement device for a dump truck whereby the loaded weight can be detected inexpensively and accurately, in a dump truck having two pairs of wheels supported by equalizer bars provided in a rotatable fashion. Other objects of the present invention will become apparent from the following description of the embodiments.

In order to achieve the aforementioned objects, the loaded weight measurement method for a dump truck relating to the present invention is a loaded weight measurement method for a dump truck comprising a set of equalizer bars respectively provided rotatably on the left and right-hand sides of a vehicle body; first vehicle wheels supported respectively by means of first suspension devices on one side of each equalizer bar; second vehicle wheels supported respectively by means of second suspension devices on the other side of each equalizer bar; and third vehicle wheels provided respectively on the left and right-hand sides of the vehicle body separately from the equalizer bars, and being supported respectively by means of third suspension devices, the loaded weight measurement method comprising: a first step of detecting a first load applied to either the first suspension device or the second suspension device; a second step of detecting a second load applied to the third suspension device; a third step of detecting the angle of inclination of the vehicle body; and a fourth step of calculating a loaded weight on the basis of the first and second loads detected respectively in the first and second steps, and the angle of inclination detected in the third step.

A composition may be adopted wherein a judgment step for judging whether or not the equalizer bars are in a state of free rotation is executed prior to the first step, respective steps following the first step are executed if it is judged in the judgment step that the equalizer bars are in a state of free rotation, and a notification is reported if it is judged in the judgment step that the equalizer bars are not in a state of free rotation.

A composition may be adopted wherein the judgment step judges whether or not the equalizer bars are in a state of free rotation on the basis of a detection signal from abutment detecting means for detecting an abutted state of the equalizer bars and the vehicle body.

A composition may be adopted wherein the judgment step judges whether or not the equalizer bars are in the state of free rotation, by comparing at least one of the first load detected in an empty state in the first step and the loaded weight calculated in an empty state in the fourth step, with a previously established prescribed value for an empty state.

The loaded weight measurement device for a dump truck according to a further aspect of the present invention comprises: a first load detecting section for detecting a first load applied to either the first suspension device or the second suspension device, on the basis of a detection signal from first load detecting means provided in only one of the first suspension device and the second suspension device; a second load detecting section for detecting a second load applied to a third suspension device on the basis of a detection signal from second load detecting means provided in the third suspension device; a total load calculating section for calculating a total load applied to the first and second suspension devices on the basis of the ratio between the respective distances from the center of rotation of the equalizer bar to the first and second suspension devices, and the detected first load; a vertical component calculating section for respectively calculating the vertical component of the calculated total load and the vertical component of the detected second load, on the basis of a detection signal from inclination angle detecting means provided in the vehicle body; and an overall load calculating section for calculating an overall load by adding the vertical component of the total load thus calculated to the vertical component of the second load thus calculated.

According to the present invention, in a dump truck comprising first vehicle wheels and second vehicle wheels which are coupled by equalizer bars, it is possible to calculate the loaded weight by using first and second load detecting means only, without provided load detecting means in all of the suspension devices. Therefore, it is possible to detect the loaded weight accurately by means of a small number of detecting means.

According to the present invention, it is possible to start measurement of the loaded weight after judging whether or not the equalizer bars are in a state of free rotation. Therefore, it is possible to measure the loaded weight after previously confirming that accurate measurement can be achieved. If accurate measurement is not possible, then a notification to this effect is reported to the truck operator or loading operator, or the like, in order that suitable countermeasures can be adopted.

DESCRIPTION OF THE PREFERRED EMBODIMENTS

Figure 1:
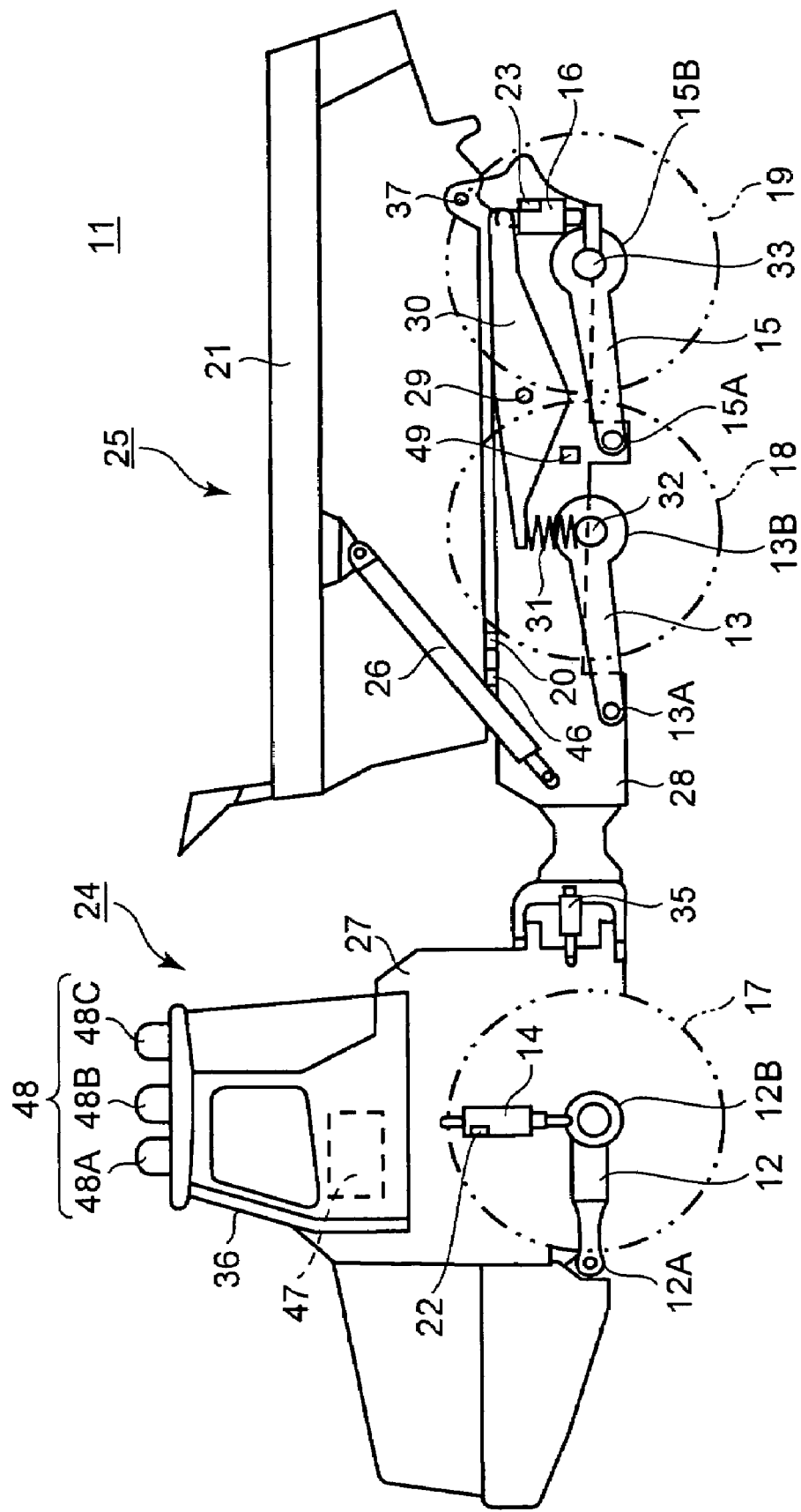
FIG. 1 is a side view of a dump truck relating to an embodiment of the present invention.

Below, an embodiment of the present invention is described in detail with reference to the drawings. As described below, the present embodiment discloses a dump truck (11) having vehicle bodies (24, 25); a vessel (21) provided on the vehicle body (25); a set of equalizer bars (30) respectively provided rotatably on the left and right-hand sides of the vehicle body (25); first vehicle wheels (18) supported respectively on one side of each equalizer bar (30) by means of a first suspension device (31); second vehicle wheels (19) supported respectively on the other side of each equalizer bar (30) by means of a second suspension device (16); and third vehicle wheels (17) provided respectively on the left and right-hand sides of the vehicle body (24), separately from the equalizer bars (30), and supported respectively by means of a third suspension device (14).

The dump truck (11) further comprises: first load detecting means (23, 230) for detecting a first load acting on either the first suspension device (31) or the second suspension device (16); second load detecting means (22, 220) for detecting a second load acting on the third suspension device (14); inclination angle detecting means (20) for detecting the angle of inclination of the vehicle body (25); control means (47) for calculating the loaded weight of the vessel (21) on the basis of the first and second loads and the angle of inclination; and outputting means (48, 47B, 114) for outputting the loaded weight calculated by the control means (47).

First Embodiment

A first embodiment of the present invention will be described with reference to FIG. 1–FIG. 8. FIG. 1 is a side view of an articulated type dump truck 11.

As shown in FIG. 1, the dump truck 11 comprises a front vehicle body 24 disposed on the front side and a rear vehicle body 25 disposed on the rear side. The front vehicle body 24 is supported by means of a front frame 27 and the rear vehicle body 25 is supported by means of a rear frame 28. The rear frame 28 is coupled bendably and swingably with respect to the front frame 27. An driver's cabin 36 is mounted on the front frame 27.

A left and right-hand pair of steering cylinders 35, 35 are provided spanning between the front frame 27 and the rear frame 28. By respectively extending or contracting the steering cylinders 35, 35, the rear frame 28 can be made to turn with respect to the front frame 27, and hence a steering operation can be performed.

A vessel 21 for loading a cargo, such as sand, for example, is provided on top of the rear frame 28. A pair of lift cylinders 26, 26 are provided between the left and right-hand sides of the front portion of the vessel 21 and the rear frame 28. The lower rear portion of the vessel 21 is attached rotatably to the rear frame 28 by means of vessel pins 37. By extending or contracting the lift cylinders 26, 26, the vessel 21 is rotated upwards and downwards about the vessel pins 37. The operation of raising up the vessel 21 is called "tipping up", and the operation of lowering the vessel 21 is called "tipping down". FIG. 1 shows a state where the vessel 21 has been lowered and is seated on the rear frame 28.

A front arm 12 which is V-shaped in plan view is provided rotatably on the front frame 27. The front end portion 12A of the front arm 12 (namely, the apex of the V shape) is supported on the lower portion of the front arm 27, rotatably in the vertical direction.

A pair of left and right-hand front wheels 17, 17 are installed on the two side faces of the rear end portion 12B of the front arm 12. These respective front wheels correspond to one example of "third vehicle wheels". The upper portion of the rear end section 12B is supported on the front frame 27 via a front suspension cylinder 14, which is one example of a "third suspension device".

Figure 2:
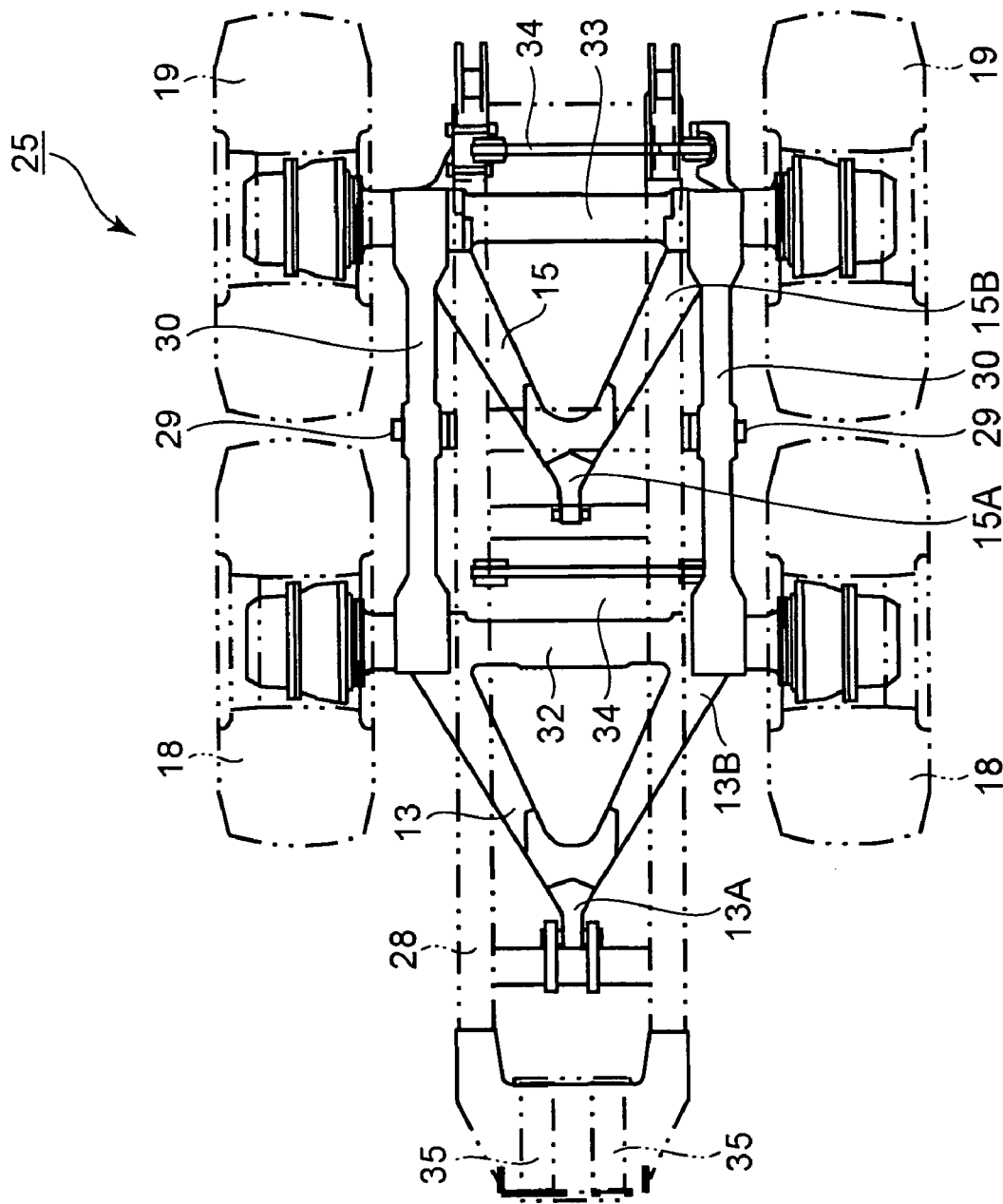
FIG. 2 is a plan view showing an enlarged view of a rear frame.

Here, FIG. 2 is a plan view of a rear frame 28 showing a state where the vessel 21 has been removed. As illustrated in FIG. 1 and FIG. 2, the left and right-hand pair of equalizer bars 30, 30 are provided rotatably on either side face of the rear frame 28. The approximate center portions of the equalizer bars 30, 30 are respectively attached rotatably to the rear frame 28 by means of pins 29, 29.

A center arm 13 and a rear arm 15 are respectively provided rotatably on the lower portion of the rear frame 28. The center arm 13 and the rear arm 15 are also formed respectively in a V shape when observed in plan view, similarly to the front arm 12.

The front end section 13A of the center arm 13 is supported rotatably in the vertical direction on the lower front side of the rear frame 28. A pair of left and right-hand central wheels 18, 18 are installed on the two side faces of the rear end portion 13B of the center arm 13. These respective center wheels 18, 18 correspond to one example of the "first vehicle wheels". The upper portion of the rear end section 13B is supported on the lower side of the front end portion of the equalizer bars 30, 30, by means of springs 31, 31, which are one example of a "first suspension device".

The front end section 15A of the rear arm 15 is supported rotatably in the vertical direction on the lower rear side of the rear frame 28. A pair of left and right-hand rear wheels 19, 19 are installed on the two side faces of the rear end portion 15B of the rear arm 15. These rear wheels 19, 19 correspond to one example of "second vehicle wheels". The upper portion of the rear end section 15B is supported on the lower side of the rear end portion of the equalizer bars 30, by means of a rear suspension cylinder 16, which is one example of a "second suspension device".

Figure 3:
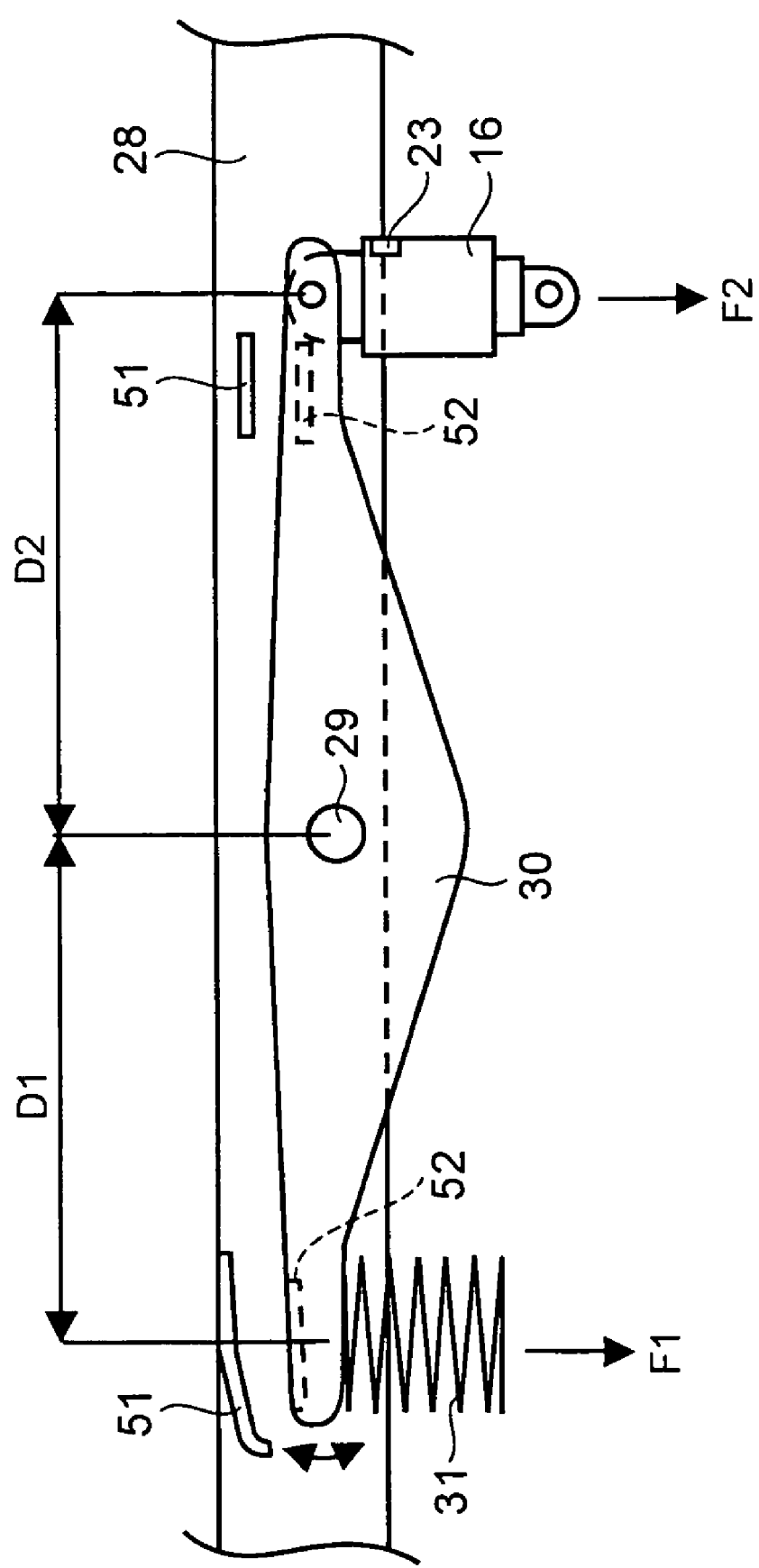
FIG. 3 is a side view showing an enlargement of the vicinity of an equalizer bar.

FIG. 3 is a side view showing a partial enlargement of an equalizer bar 30. As shown in FIG. 3, stoppers 51, 51 are provided respectively on either side face of the rear frame 28, in such a manner that they correspond respectively to the front end section and the rear end section of the equalizer bars 30. The stoppers 51, 51 are provided in such a manner that they project slightly towards the equalizer bars 30 from the side face of the rear frame 28.

Furthermore, bases 52, 52 are provided respectively on the side faces of the equalizer bars 30 in such a manner that correspond to the stoppers 51, 51. The bases 52, 52 are provided in such a manner that they project slightly towards the equalizer bars 30. If the equalizer bar 30 is rotated through a prescribed angle or more, then the bases 52, 52 abut against the stoppers 51, 51, thereby preventing further rotation.

Returning to FIG. 1, a controller 47 for measuring the loaded weight is provided in the driver's cabin 36 of the dump truck 11. The controller 47 is one example of "control means".

Furthermore, an external display lamp set 48 is provided at the base of the driver's cabin 36. This external display lamp set 48 serves to provide an external display indicating the ratio of the actual loaded weight to the rated loaded weight. The external display lamp set 48 may be constituted, for example, by a plurality of lamps 48A, 48B and 48C, each having a different color. For instance, lamp 48A is green, lamp 48B is orange and lamp 48C is red.

The controller 47 controls the lighting up and extinguishing of the lamps 48A–48C in accordance with the weight of the cargo loaded into the vessel 21. For example, if the loaded weight is 50% or less of the rated loaded weight, then the controller 47 does not light up any of the lamps. If the loaded weight is 50–89% of the rated loaded weight, then the controller 47 lights up the green lamp 48A. If the loaded weight is 90–100% of the rated loaded weight, then the controller 47 lights up the orange lamp 48B. Furthermore, if the loaded weight is 100% or above of the rated loaded weight, then the controller 47 lights up the red lamp 48C.

To take account of errors in the measurement of the loaded weight, it is also possible to light up the orange lamp 48B if the loaded weight is within 90–104% of the rated loaded weight, and similarly, to light up the red lamp 48C if the loaded weight is 105% or above of the rated loaded weight. Furthermore, the colors of the lamps and the loaded weight categories (50% or below, 50–89%, 90–100% and 100% or above) are only examples and may be modified in various ways.

The loading operator who is loading the cargo into the vessel 21 of the dump truck 11 observes the display on the external display lamp set 48 while carrying out the loading operation. The loading operator loads the cargo into the vessel 21 in such a manner that the loaded weight becomes approximately 100% of the rated loaded weight.

An inclination sensor 20, which is one example of "inclination angle detecting means", is provided in the rear frame 28. This inclination sensor 20 measures the inclination of the vehicle body in the forward/rearward direction and outputs a detection signal to the controller 47.

A seating sensor 46 is provided between the rear frame 28 and the vessel 21. This seating sensor 46 serves to judge whether or not the vessel 21 is seated on the rear frame 28. If the vessel 21 is seated on the rear frame 28, then the seating sensor 46 detects this seated state and outputs a signal to the controller 47.

A vehicle speed sensor 49 is provided on the output shaft of the transmission (not illustrated). This vehicle speed sensor 49 detects the number of revolutions of the output shaft (namely, the vehicle speed), and outputs the result to the controller 47.

A front pressure sensor 22 is provided in the front suspension cylinder 14 as one example of a "second load detecting device". This front pressure sensor 22 detects the pressure of the oil inside the front suspension cylinder 14 and outputs the detected pressure to the controller 47.

Similarly, a rear pressure sensor 23 is provided in the rear suspension cylinder 16 as one example of a "first load detecting device". This rear pressure sensor 23 detects the pressure of the oil inside the rear suspension cylinder 16 and outputs the detected pressure to the controller 47.

The aforementioned pressure sensors 22 and 23, the inclination sensor 20, the seating sensor 46 and the vehicle speed sensor 49 are respectively connected electrically to the controller 47. As described hereinafter, the controller 47 is able to receive signals from the respective sensors.

Figure 4:
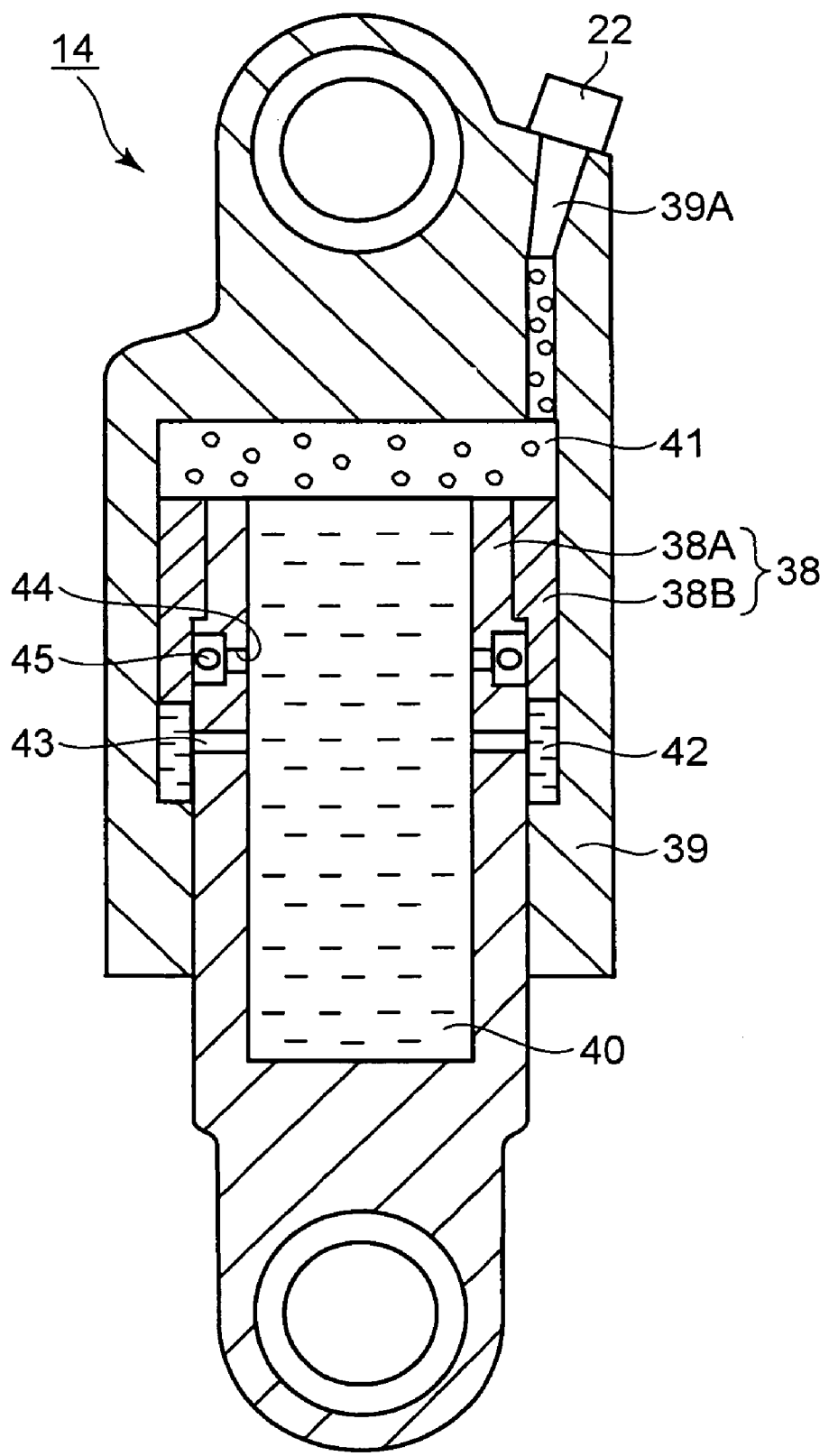
FIG. 4 is a cross-sectional diagram of a suspension cylinder.

FIG. 4 shows a cross-sectional diagram of a suspension cylinder. Here, a front suspension cylinder 14 is shown as an example, but a similar composition is also adopted for the rear suspension cylinder 16.

As shown in FIG. 4, the front suspension cylinder 14 comprises a piston 38 and a cylinder 39 to which this piston 38 is attached in a slidable fashion. The piston 38 comprises, for example, a bottomed cylinder-shaped piston main body 38A and a cylinder-shaped ring member 38B provided on the outer circumference of the upper portion of the piston main body 38A.

Oil 40 is sealed inside the piston main body 38A. Nitrogen gas 41 is sealed in the space between the piston 38 and the cylinder 39.

A ring-shaped cavity 42 is formed between the piston main body 38A and the cylinder 39, in a position below the ring member 38B. A prescribed number of first orifices 43 are provided at a prescribed position in the longitudinal direction of the piston main body 38A, these orifices being spaced at intervals in the circumferential direction. The first orifices 43 are formed respectively in such a manner that the internal space of the piston main body 38A and the cavity 42 are interconnected. Furthermore, a prescribed number of second orifices 44 are provided respectively in a different position to the first orifices 43 in the longitudinal direction, these second orifices being spaced at intervals in the circumferential direction. Check bores 45 are provided respectively to the outer side of each second orifice 44.

If, for example, the front wheels 17 ride up onto a projection, or the like, in the road surface, then the front wheels 17 are raised by the projection and hence the piston 38 moves upwards and enters inside the cylinder 39. More specifically, the front suspension cylinder 14 is compressed. Thereby, when the piston 38 enters inside the cylinder 39, the volume of the space formed between the upper part of the piston 38 and the cylinder 39 is reduced, and hence the nitrogen gas 41 is compressed. Furthermore, the pressure of the oil 40 sealed inside the piston main body 38A also increases when the front suspension cylinder 14 is compressed. Accordingly, the oil 40 inside the piston main body 38A flows into the cavity 42 by passing through the respective first orifices 43 and second orifices 44.

On the other hand, when the front wheels 17 have ridden over the projection, the piston 38 moves downwards and the front suspension cylinder 14 extends. When the piston 38 retracts inside the cylinder 39, then the pressure in the piston main body 38A declines. Since the second orifices 44 are sealed respectively by the check bores 45, then the oil 40 in the cavity 42 returns to the piston main body 38A by passing through the first orifices 43 only.

A pressure measurement hole 39A for measuring the pressure of the nitrogen gas 41 is formed in the upper side of the cylinder 39. One end of this pressure measurement hole 39A is connected to the space between the cylinder 39 and the piston 38, and the other end thereof is open externally on the upper side of the cylinder 39. A front pressure sensor 22 is provided on this other end of the pressure measurement hole 39A.

The pressure of the nitrogen 41 sealed between the cylinder 39 and the piston 38 is guided to the front pressure sensor 22, by means of the pressure measurement hole 39A. The front pressure sensor 22 converts the pressure of the nitrogen gas 41 into an electrical signal, which is output to the controller 47. By measuring the pressure of the nitrogen gas 41, it is possible to measure the load (which corresponds to an example of the "second load") that is applied to the front suspension cylinder 14. By this means, it is possible to determine the load applied to the front wheel 17 to which the front suspension cylinder 14 is attached.

Figure 5:
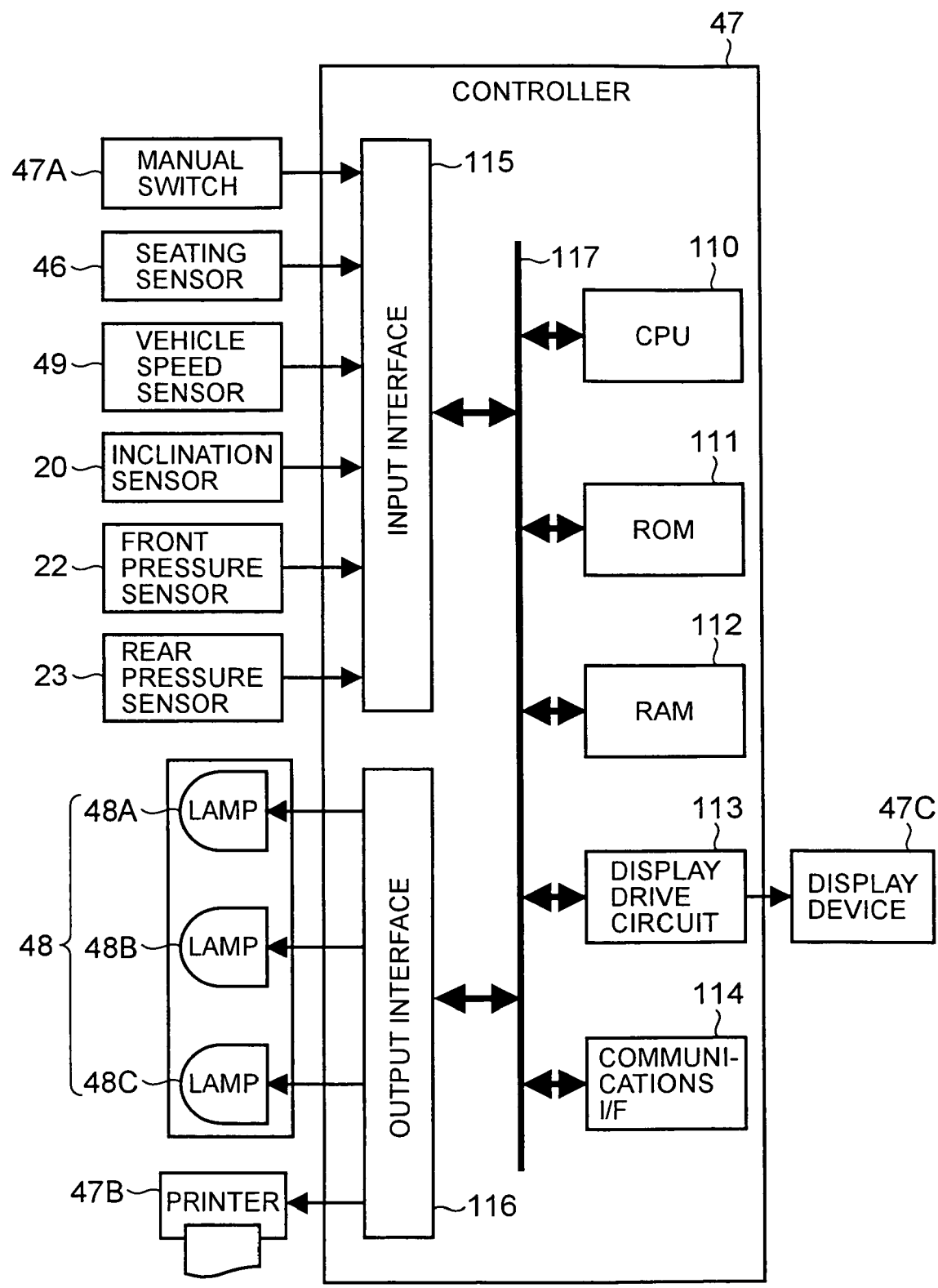
FIG. 5 is a block diagram showing the circuit structure of a controller.

FIG. 5 is a block diagram showing the general composition of the controller 47. The controller 47 corresponds to one example of a "loaded weight measurement device for a dump truck". The controller 47 may be constituted by a microcomputer system.

The controller 47 may be constituted, for example, by a CPU (Central Processing Unit) 110, a ROM (Read Only Memory) 111, a RAM (Random Access Memory) 112, a display drive circuit 113, a communications interface 114, an input interface 115, an output interface 116, and a bus 117 which interconnects these respective units.

The CPU 110 reads out and executes microprogram code stored in the ROM 111. Thereby, respective processes as described below are implemented. The RAM 112 is used as a work area for temporarily storing results during calculation. Furthermore, control flag information, or the like, may also be stored in the RAM 112.

The display drive circuit 113 drives a display device 47C provided inside the driver's cabin 36. Information relating to the loaded weight, and the like, may be displayed on the display device 47C, as and when appropriate. The communications interface 114 may be provided when data communications are performed with a management server (not illustrated) which is disposed in a management centre, or the like. If the display device 47C is not used, then the display drive circuit 113 is not necessary. Furthermore, if the controller 47 does not conduct data communications, or the like, with an external device, then the communications interface 114 is not necessary.

The input interface 115 is a circuit for respectively receiving signals from various sensors, and the like. The input interface 115 may be connected respectively, for example, to a manual switch 47A, the seating sensor 46, vehicle speed sensor 49, inclination sensor 20, front pressure sensor 22, and rear pressure sensor 23. The manual switch 47A is a switch for instructing the controller 47 to switch on a power supply and start a calibration process, or the like, and it is provided inside the driver's cabin 36. The manual switch 47A is operated by the operator of the dump truck 11.

The output interface 116 is a circuit for externally outputting control signals from the controller 47. The external display lamp set 48 and the printer 47B, which forms one example of an external output device, are connected to the output interface 116, for instance. The external output device is not limited to the printer 47B and various types of storage devices, such as a flexible disk device, optical disk device, hard disk device, semiconductor memory device, or the like, may be used. It is possible to analyze the operating efficiency of the dump truck 11, and the like, by recording the loaded weight measured by the controller 47, together with the measurement date and time, and the like, on a recording medium.

The composition shown in FIG. 5 is one example and the present invention is not limited to this example. For instance, the controller 47 may also be constituted by a hardware circuit comprising a logical LSI (Large Scale Integration) or the like.

Figure 6:
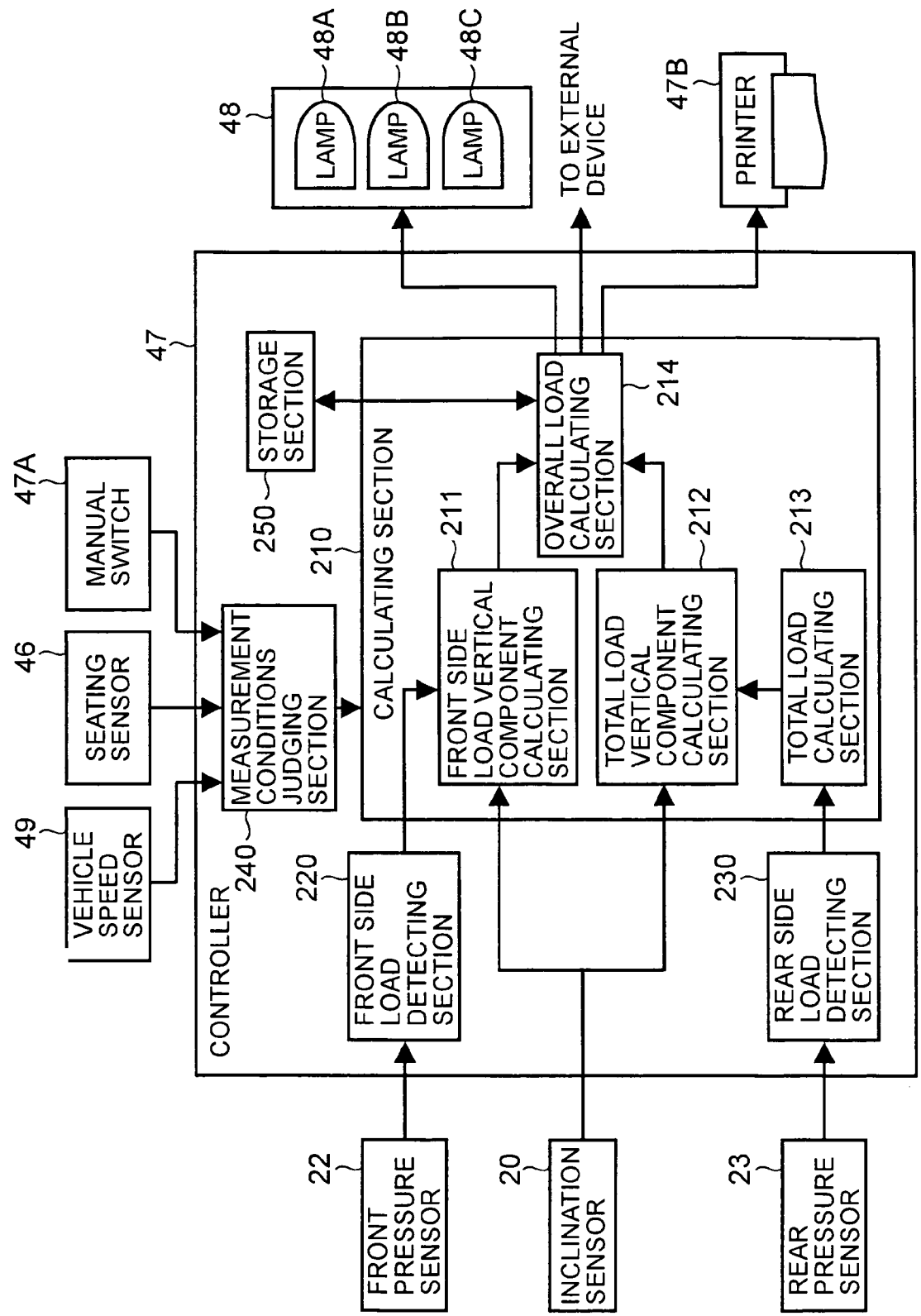
FIG. 6 is a block diagram showing the functional composition of a controller.

FIG. 6 is a block diagram focusing on the functional composition of the controller 47. The controller 47 may comprise, for example, a calculating section 210, a front side load detecting section 220, a rear side load detecting section 230, a measurement conditions judging section 240, and a storage section 250. Firstly, the peripheral functions of the calculating section 210 will be described, whereupon the details of the calculating section 210 will be described.

The front side load detecting section 220 detects the load applied to the front suspension cylinder 14 (the "second load"), on the basis of the detection signal from the front pressure sensor 22. Similarly, the rear side load detecting section 230 detects the load applied to the rear suspension cylinder 16 (the "first load"), on the basis of the detection signal from the rear pressure sensor 23. These load detecting sections 220 and 230 may be realized by means of a CPU 110 reading in and executing a microprogram code stored in the ROM 111, for example. The load detecting sections 220 and 230 do not have to be provided in the controller 47 and may also be provided in the pressure sensors 22 and 23. More specifically, the pressure sensors 22 and 23 may also be constituted by intelligent type pressure sensors provided with a signal processing LSI, or the like.

The measurement condition judging section 240 judges, for example, whether or not the start conditions for measuring the respective processes described below have been established. The measurement condition judging section 240 judges whether or not the prescribed conditions have been established on the basis of the signals from the manual switch 47A, the seating sensor 46 and the vehicle speed sensor 49, for example. One example of a prescribed condition is whether or not the dump truck 11 has halted, for instance. The measurement condition judging section 240 may be realized by means of a CPU 110 reading in and executing a microprogram code stored in the ROM 111, for example.

The storage section 250 is realized by a RAM 112, for example. The storage section 250 can store, for example, the loaded weight calculated by the calculating section 210, the initial load in an empty state, control information, and the like.

The calculating section 210 performs calculation processes. The calculating section 210 may comprise, for example, a front side load vertical component calculating section 211, a total load vertical component calculating section 212, a total load calculating section 213, and an overall load calculating section 214.

The front side load vertical component calculating section 211 calculates the vertical component of the front side load on the basis of the front side load detected by the front side load calculating section 220 and the angle of inclination of the vehicle body detected by the inclination sensor 20.

The front side load vertical component calculating section 211 constitutes one example of a "vertical component calculating section", in conjunction with the total load vertical component calculating section 212.

The total load calculating section 213 calculates the total load applied to the springs 31 and the rear suspension cylinder 16 on the basis of the rear side load detected by the rear side load detecting section 230 and the mechanical settings of the equalizer bars 30 and the like. In other words, it calculates the total of the loads applied respectively to the central wheels 18 and the rear wheels 19.

As described further hereinafter, if the central wheels 18 and the rear wheels 19 are balanced by the equalizer bars 30, as shown in FIG. 3, then the moment at the central wheels 18 (the center moment) and the moment at the rear wheels 19 (the rear moment) are equal. The center moment is derived from the product of the center load F1 and the distance D1 from the pin 29 to the spring 31 (F1·D1). The rear moment is derived from the product of the rear load F2 and the distance D2 from the pin 29 to the center of the rear suspension cylinder 16 (F2·D2).

Therefore, since (F1·D1)=(F2·D2), the equation F1=(F2·D2)/D1 can be obtained. As this equation shows, the center load F1 can be determined from the rear load F2, and the set mechanical values of the equalizer bar 30 (D1 and D2), only. By performing a calculation of this kind, the total load calculating section 213 is able to calculate the total value of the loads applied to the center and rear sides.

The total load vertical component calculating section 212 calculates the vertical component of the total load on the basis of the total load detected by the total load calculating section 213 and the angle of inclination of the vehicle body detected by the inclination sensor 20.

The overall load calculating section 214 calculates the overall load by adding together the calculation results of the front wide load vertical component calculating section 211 and the total load vertical component calculating section 212. The overall load calculated in an empty state is taken as the initial load. By subtracting the initial load from the overall load calculated when the vehicle is in a loaded state, it is possible to determine the current loaded weight.

The lighting up of the external display lamp set 48 is controlled on the basis of the loaded weight calculated by the overall load calculating section 214. Furthermore, the loaded weight thus calculated is stored in the storage section 250 and printed on the printer 47B. Moreover, for example, information such as the calculated loaded weight, the measurement date and time, and identification information for the dump truck 11, may also be transmitted to an external management device, by means of the communications interface 114.

Below, a sequence for measuring the loaded weight will be described. When detecting the loaded weight, firstly, all of the loads applied to the front wheels 17, the central wheels 18 and the rear wheels 19 are measured, when the vehicle is in an empty state with no cargo loaded in the vessel 21. In other words, the initial load prior to loading is measured. In the present specification, this measurement of the initial load is called "calibration". The initial load when the vessel 21 is empty, is the unsprung weight of the dump truck 11 in an empty state. This initial load may also be called "empty load". After measuring the initial load, the overall load when the cargo has been loaded into the vessel 21 is measured, and by subtracting the initial load from this overall load, the loaded weight of cargo is calculated.

Figure 7:
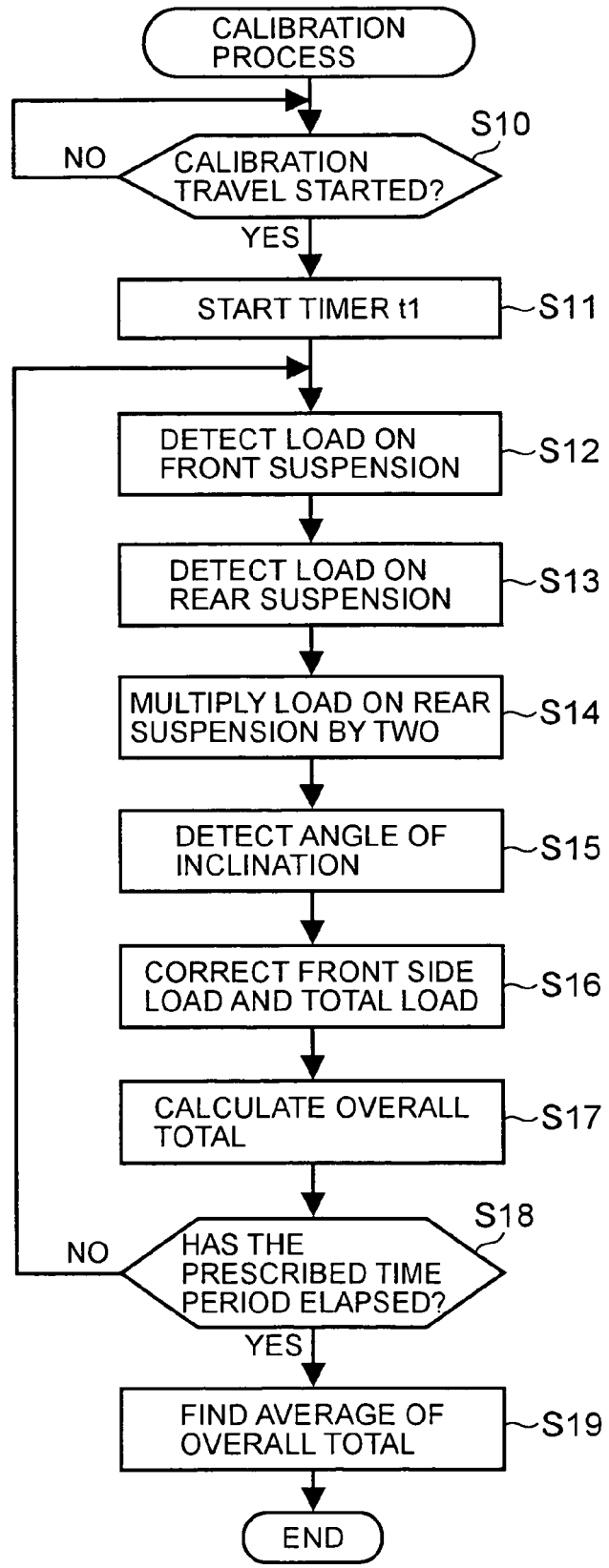
FIG. 7 is a flowchart showing a calibration process.

FIG. 7 is a flowchart showing an overview of calibration processing. Of the suspension cylinders and pressure sensors provided respectively on the left and right-hand sides of the vehicle, the following description relates to the suspension cylinder and pressure sensor provided on one side, but in practice, similar calculations are carried out for the other side as well, and the average of the values acquired on the left and right-hand side is obtained. Furthermore, here "step" is abbreviated to "S".

When performing a calibration process, the dump truck 11, with the vessel 21 in an empty state, is caused to travel in a straight line over a relatively flat terrain at a prescribed approximately uniform speed, for a prescribed time period t1 (for example, 30 seconds). This is called "calibration travel". Therefore, in this process, it is first judged whether or not calibration travel has started (S10). The judgment of whether or not calibration travel has started can be made on the basis of a signal from the vehicle speed sensor 49 and the seating sensor 46, for example.

If calibration travel has started (S10: YES), then the controller 47 starts a timer for measuring the prescribed time period t1 (S1).

Furthermore, the controller 47 detects the load applied to the front suspension cylinder 14 on the basis of the signal from the front pressure sensor 22 provided in the front suspension cylinder 14 (S12). The load applied to the front suspension cylinder 14 which is detected at S12 is called the "front side load".

Next, the controller 47 detects the load applied to the rear suspension cylinder 16 (hereafter, called the "rear load") on the basis of the signal from the rear pressure sensor 23 provided in the rear suspension cylinder 16 (S13).

The controller 47 multiplies the detected rear load by two (S14). In this way, the sum of the rear load and the load applied to the spring 31 (hereafter, called the "center load") is determined. This sum is called the "total load".

Here, step S14 will be described in more detail. As shown in FIG. 3, the central wheel 18 and the rear wheel 19 are supported on either end of a rotatable equalizer bar 30, by means of the spring 31 and the rear suspension cylinder 16. If the rotatable equalizer bar 30 is not rotated, then the moment applied to the front end of the equalizer bar 30 is equal to the moment applied to the rear end of the equalizer bar 30.

In other words, as described previously, the product of the center load F1 and the distance D1 from the pin 29 to the center of the spring 31 (namely, F1·D1) is equal to the product of the center load F2 and the distance D2 from the pin 29 to the center of the rear suspension cylinder 16 (namely, F2·D2). Therefore, it is possible to obtain the equation F1=(F2·D2)/D1, as stated previously. It can be seen that the central load F1 can be derived from this equation by multiplying the rear side load F2 by (1+D2/D1), (namely, F1=F2×(1+D2/D1)).

In the present embodiment, a pin 29 is provided in approximately the central portion of the equalizer bar 30, and the values of D1 and D2 are approximately the same (D1=D2). Since the respective distances from the pin 29 forming the fulcrum point are equal, then the rear load F2 is approximately equal to the central load F1 (F1=F2). Consequently, it is possible to determine the total load (F1+F2) simply by multiplying the rear load F2 by two.

Next, the controller 47 detects the angle of inclination of the dump truck 11 in the forward/rearward direction, on the basis of the signal from the inclination sensor 20 (S15). The controller 47 corrects the front side load, and the total of the central load and the rear load, to respective vertical component loads on the basis of the angle of inclination (S16). By this means, a corrected value for the front side load applied to the front wheels 17 and a corrected value for the total load applied to the central wheels 18 and the rear wheels 19 are derived.

The controller 47 calculates an overall load value by adding together the corrected value of the front load and the corrected value of the total load (S17). The controller 47 stores this overall load value in the storage section 250 and it repeats steps S12 to S17 until the prescribed time period t1 has passed (S18).

When the prescribed time period has passed (S18: YES), the controller 47 finds the average of the plurality of overall load values stored in the storage section 250 (S19). This average is taken as the initial load of the dump truck 11. The controller 47 stores the initial load thus calculated in the storage section 250 and then terminates this processing sequence.

Figure 8:
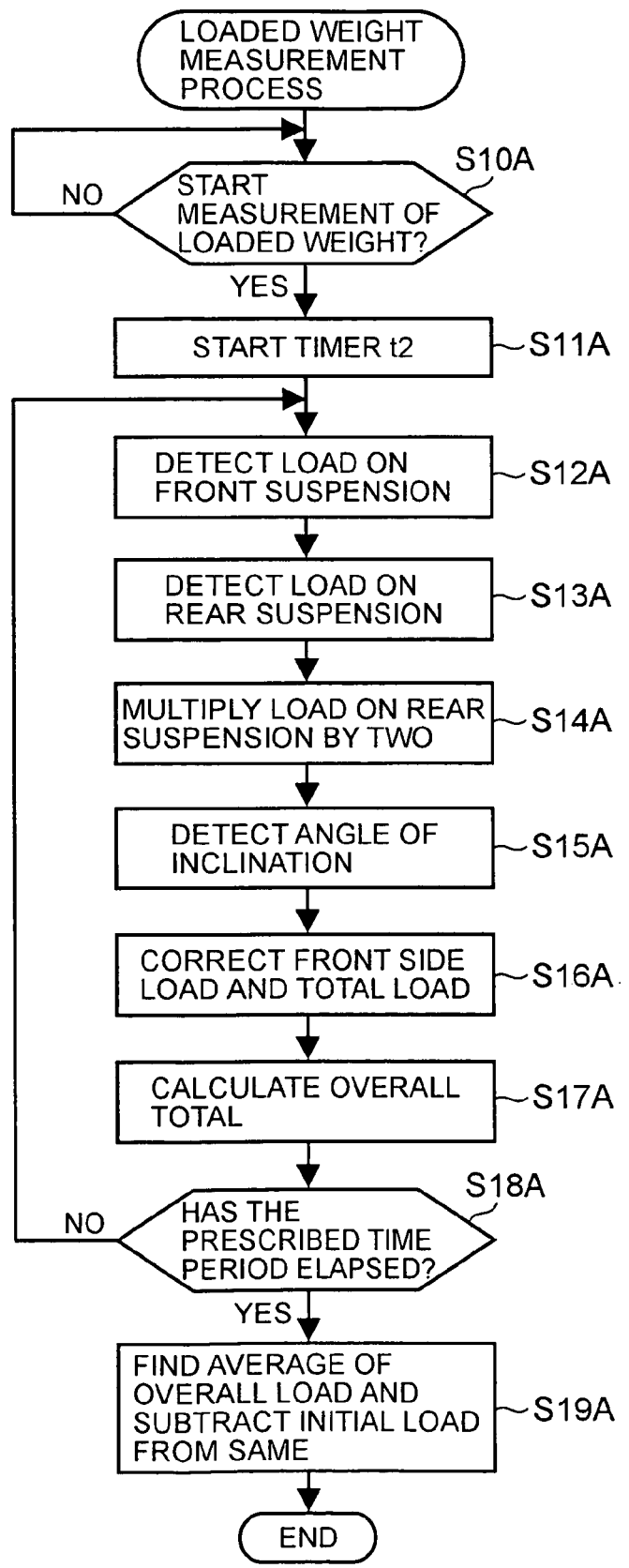
FIG. 8 is a flowchart illustrating a loaded weight measurement process.

FIG. 8 is a flowchart showing an overview of a process for measuring the loaded weight when cargo has been loaded into the vessel 21. This process can be performed by a sequence that is substantially the same as that in S10–S19 shown in FIG. 7.

Firstly, the controller 47 judges whether or not a loaded weight measurement process has started (S10A). For example, if the manual switch 47A includes a "measurement start switch", then the loaded weight measurement process is started when the operator activates this switch (S10A: YES).

Here, for example, the start date and time of the loaded weight measurement process is compared with the registration date and time of the initial load stored in the storage section 250. If a prescribed period of time or more has passed since the registration date and time of the initial load, then it is possible to prompt the operator to carry out new registration of the initial load, via the external display lamp set 48 or the display device 47C. Alternatively, when outputting a measurement result from the loaded weight measurement process, it is possible to output the initial load value used as a basis for the measurement, and the date and time of registration of that initial value, together with the result.

When a measurement process is started, the controller 47 starts a timer for measuring a second prescribed time period t2 (S11A). This timer t2 is used in order to measure the loaded weight a plurality of times.

Similarly to the calibration process described above, the controller 47 detects the front side load and the rear side load (S12A, S13A), and derives a total load by multiplying the rear load by two (S14A). The controller 47 then detects the angle of inclination (S15A), and respectively corrects the front side load and the total load on the basis of the angle of inclination (S16A).

The controller 47 calculates the overall load by adding together the vertical component of the front side load and the vertical component of the total load (S17A). The controller 47 stores the calculated overall load value in the storage section 250 and it repeats steps S12A to S17A until the prescribed time period t2 has passed (S18A).

When the prescribed time period t2 has elapsed (S18A: YES), the controller 47 finds the average of the plurality of overall loads stored in the storage section 250 and then calculates the loaded weight by subtracting the initial load from this average value (S19A).

According to the present embodiment as described above, the central wheel 18 is supported on the equalizer bar 30 by means of a spring 31 and the rear wheel 19 is supported on the equalizer bar 30 by means of a rear suspension cylinder 16.

Therefore, the rear load is determined by a rear pressure sensor 23 provided in the rear suspension cylinder 16, and the total of the central load and the rear load is found by multiplying the rear load by two. In the present embodiment, it is sufficient only to measure the rear load directly, and there is no need to measure the load applied to the spring 31 supporting the central wheel 18. Consequently, it is not necessary to provide a sensor for detecting the amount of extension or contraction of the spring 31.

Furthermore, in the present embodiment, even if the spring 31 is replaced with a suspension cylinder for the purpose of supporting the central wheels 18, it is not necessary to provide a pressure sensor in order to determine the load applied to the suspension cylinder.

In this way, according to the present embodiment, it is possible to measure the loaded weight accurately by means of a small number of sensors, and hence loaded weight measurement performance for the dump truck 11 can be improved without significantly increasing manufacturing costs.

With the passage of time, the oil 40 inside the suspension cylinders 14 and 16 decreases, and hence variation in the output of the pressure sensors 22 and 23 can be expected. In order to correct this variation, it is desirable that the initial load be measured by performing calibration at periodic intervals.

Second Embodiment

Figure 9:
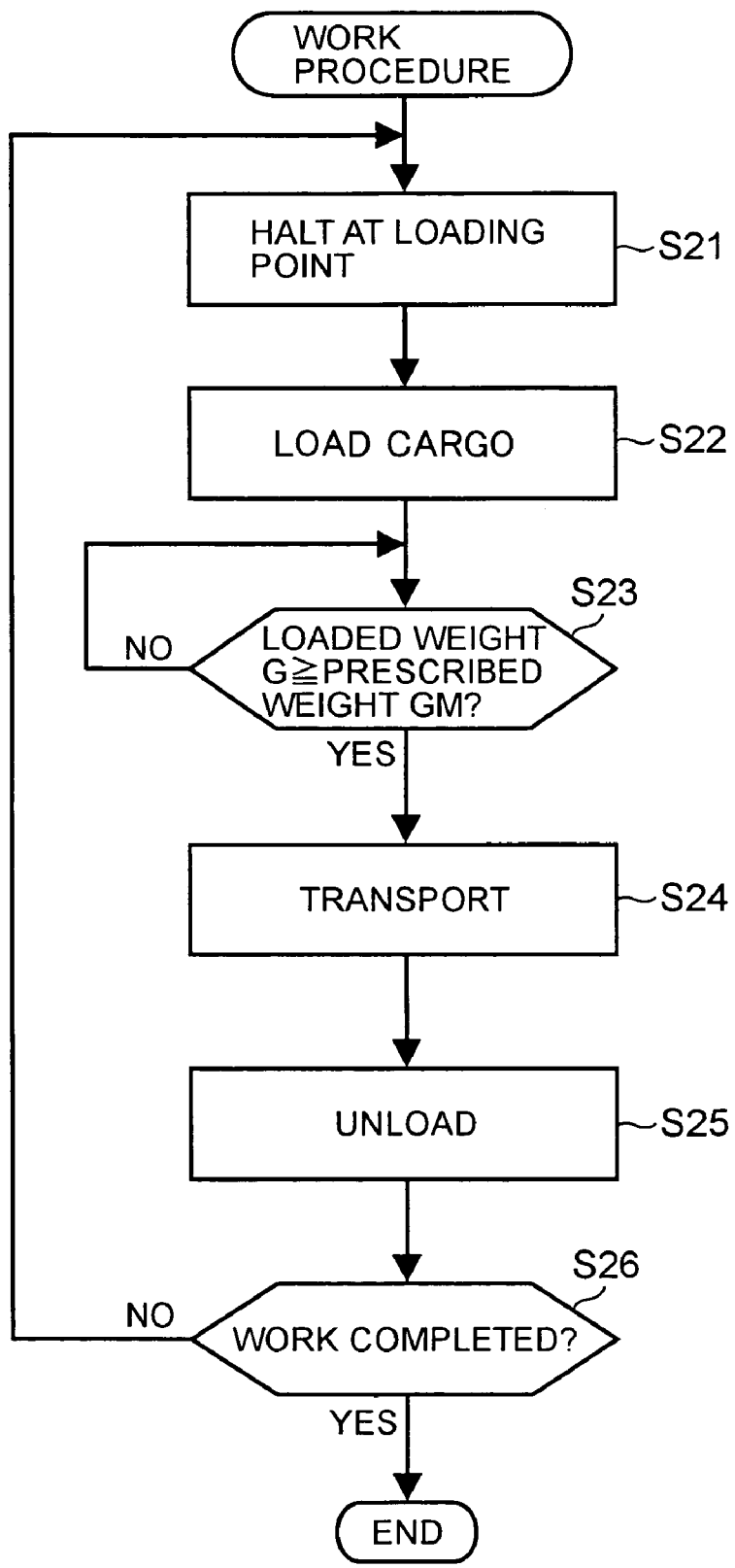
FIG. 9 is a flowchart showing a work sequence of a dump truck relating to a second embodiment.

Next, a second embodiment will be described on the basis of FIG. 9–FIG. 11. In this embodiment, as described below, it is previously judged whether or not conditions for accurately measuring the loaded weight have been established, and if accurate measurement cannot be performed, then a cautionary warning is issued to the operator, or the like. Furthermore, in this embodiment, automatic diagnosis is carried out on the basis of the loaded weight of the dump truck 11, in order to tell whether or not the truck is situated in an accurate measurement environment.

Firstly, a general work procedure of the dump truck 11 will be described. FIG. 9 shows a work procedure of the dump truck 11. The dump truck 11 halts at a loading point, with the empty vessel 21 seated on the rear frame 28 (S21). The loading operator loads a cargo to be conveyed, such as sand, into the vessel 21, by means of a hydraulic shovel, wheel loader, or the like (S22).

When the loaded weight G has become equal to or greater than a prescribed value GM (S23: YES), the dump truck 11 starts to travel and transports the cargo to a prescribed unloading point (S24). Upon arriving at the unloading point, the dump truck 11 moves the vessel 21 to the "tipped up" position, thereby unloading the cargo (S25).

When unloading has completed, the dump truck 11 moves the empty vessel 21 to the "tipped down" position, returns to the loading point and starts loading again (S26).

This sequence of steps S21–S25 is taken as one work cycle, and the dump truck 11 repeats this work cycle a plurality of times.

In a work cycle of this kind, at S21, if the dump truck 11 has halted at a loading point, then either the central wheels 18 or the rear wheels 19 may be raised up on a projection such as a rock projecting upwards from the surface at the loading point, or they may have fallen into a depression in the surface.

Figure 10:
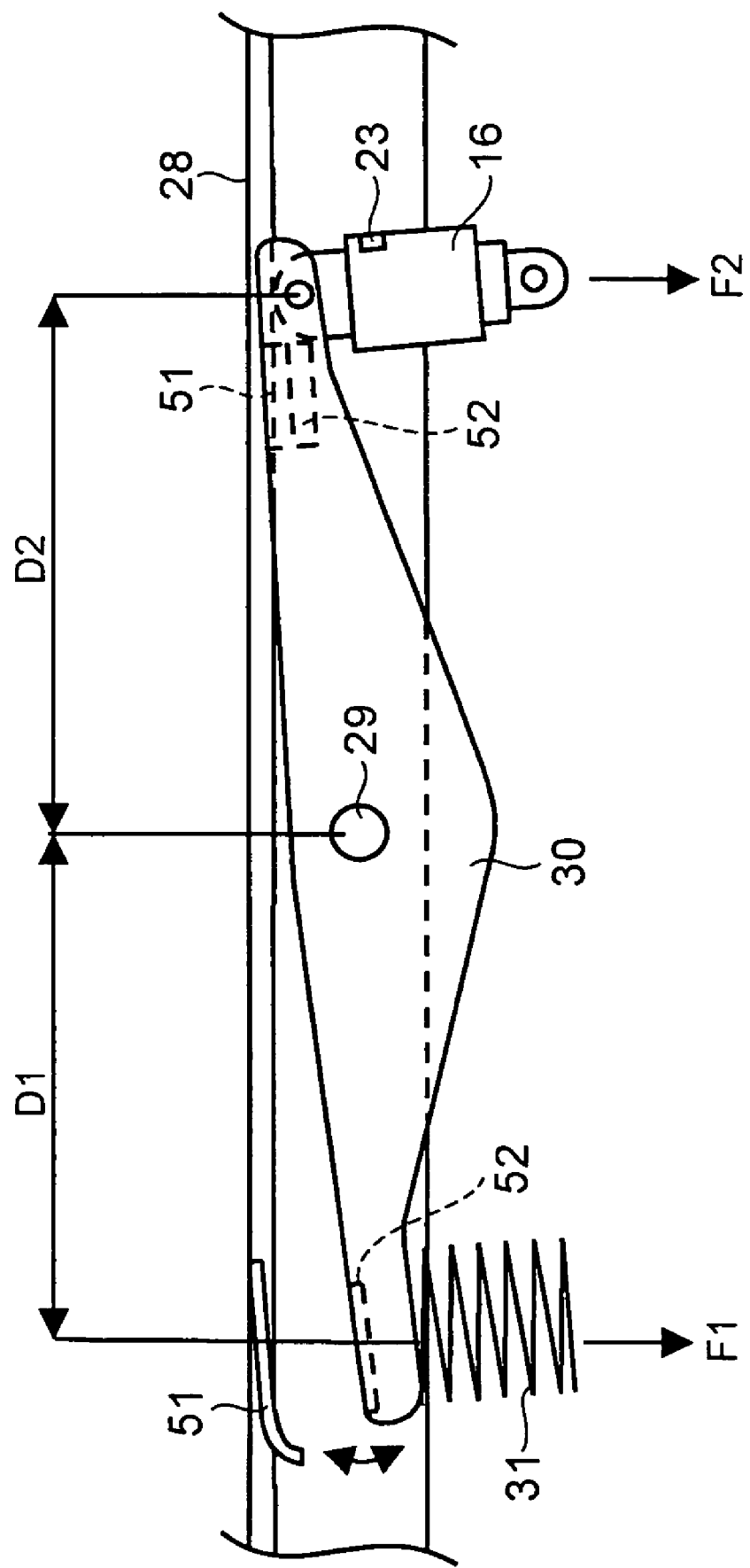
FIG. 10 is a side view of a state where an equalizer bar is abutted against a stopper.
Figure 11:
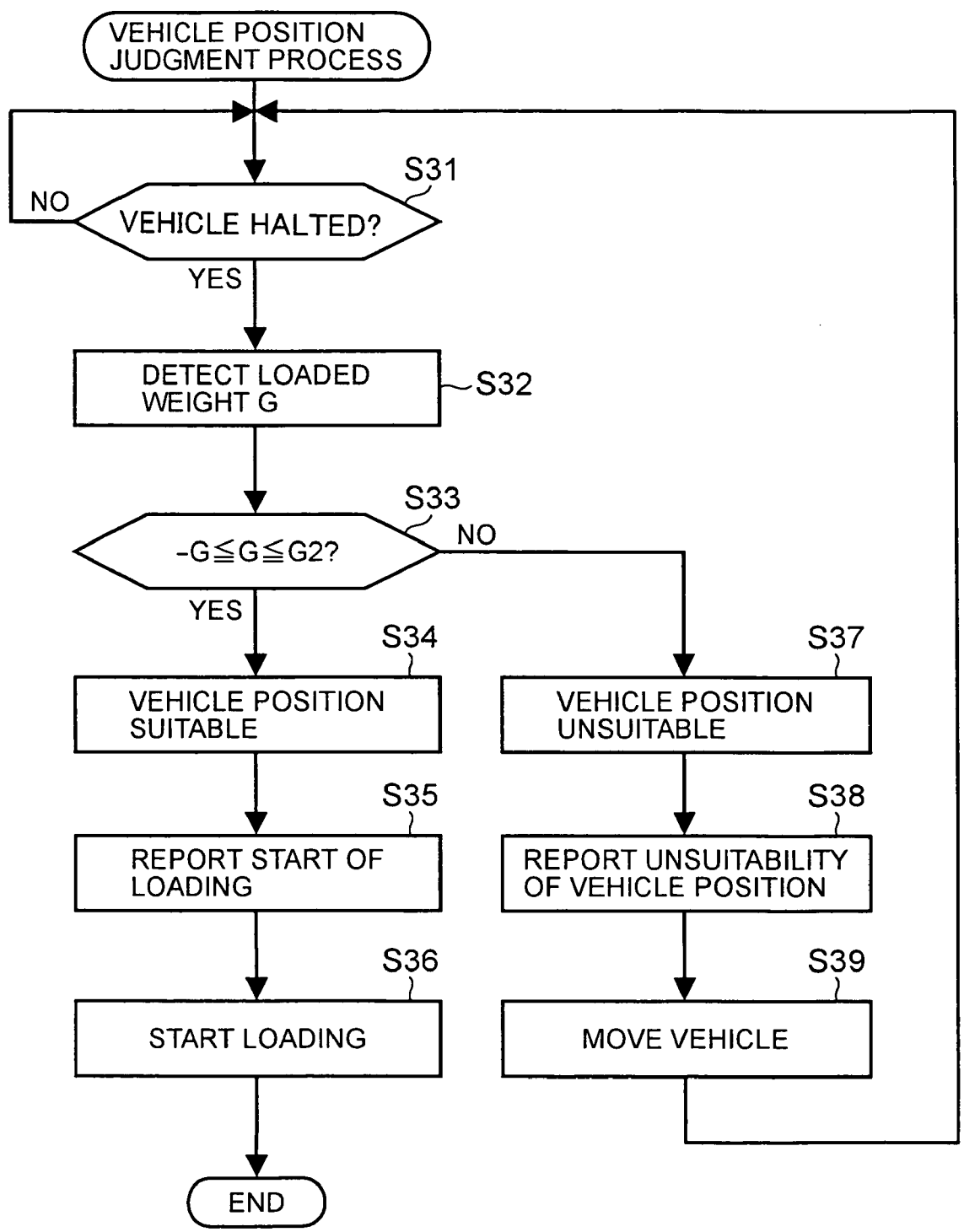
FIG. 11 is a flowchart of a process for judging the suitability of a vehicle position.

If the projection or the depression is large in size, then the equalizer bar 30 will be inclined significantly, and as shown in FIG. 10, the base 52 will make contact with the stopper 51 and further rotation of the equalizer bar 30 will be prevented. Below, this state is called a state where the equalizer bar 30 is abutted against the stopper 51.

In a state where the equalizer bar 30 is abutted against the stopper 51, the equalizer bar 30 becomes unable to rotate, and hence the front moment applied to the front end portion of the equalizer bar 30 and the rear moment applied to the rear end portion of the equalizer bar 30 are not necessarily equal.

Therefore, the premise that "the central side load F1 is equal to the rear side load F2 multiplied by $(1+D2/D1)$ (namely, $F1=F2\times(1+D2/D1)$)" is not established, and therefore it is not possible to calculate the total load accurately.

In order to avoid this, in the present embodiment, it is previously judged whether or not the equalizer bar 30 is abutting against the stopper 51, on the basis of the loaded weight when the dump truck 11 is halted in an empty state. If the equalizer bar 30 is abutting against the stopper 51, then this fact is reported to the operator of the dump truck 11, thus notifying the operator that the halt position of the dump truck 11 is unsuitable and prompting the operator to move the dump truck 11.

A more detailed description is given below. FIG. 11 is a flowchart showing an overview of a process for judging whether or not the halt position of a dump truck 11 is suitable.

Firstly, the controller 47 judges whether or not the dump truck 11 which has returned to the loading point has halted, on the basis of the signal from the vehicle speed sensor 49 (S31).

If it is judged that he dump truck 11 has halted (S31: YES), then the controller 47 detects the loaded weight G in accordance with the procedure S12–S17 described above (S32). In this case, the loaded weight G is measured during a prescribed time period and the average value thereof is found.

The controller 47 judges whether or not the loaded weight G thus measured is in a prescribed range $(-G1 \leq G \leq G2)$ (S33). Here, $-G1$ and $G2$ are values set on either side of 0, and if G is restricted within this range, then the loaded weight G can be judged to be substantially zero. This point is described further below.

If the loaded weight G is restricted within this prescribed range in the vicinity of zero (S33: YES), then the controller 47 judges that the halt position of the dump truck 11 is suitable (S34). The controller 47 then reports the fact that the halt position of the dump truck 11 is suitable, to the truck operator and loading operator (S35). The truck operator or loading operator confirms this report and then starts a loading operation (S36).

The report made in S35 may be varied according to the recipient. For example, a report can be made to the operator in the driver's cabin 36, by displaying a message, such as "halt position suitable", on the display device 47C. A report can be made to a loading operator situated outside the dump truck 11 by means of the external display lamp set 48. More specifically, for example, even if a prescribed time period (for example, approximately several seconds) has elapsed after the dump truck 11 halted, then this can be reported by extinguishing the external display lamp set 48, or the like.

Alternatively, it is also possible to report the fact that the halt position of the dump truck 11 is suitable by consecutively lighting up the green lamp 48A and the red lamp 48C in the external display lamp set 48, for example, or causing same to flash, for a prescribed short period of time. Moreover, it is also possible to provide a special lamp in order to report that the halt position is suitable. Furthermore, a report may also be provided by a synthesized voice and a buzzer sound, instead of or in conjunction with the lamps.

Conversely, if the loaded weight G has moved outside the prescribed range in the vicinity of zero (S33: NO), then the controller 47 judges that the halt position of the dump truck 11 is unsuitable (S37). The controller 47 then reports the fact that the halt position of the dump truck 11 is unsuitable, respectively, to the truck operator and unloading operator (S38).

Similarly to the foregoing description, this report may be changed in accordance with the position of the recipient (namely, if the recipient is situated inside or outside the dump truck 11). For example, a report may be made to the operator by displaying a flashing message, such as "halt position unsuitable", on the display device 47C, or by sounding a buzzer, or the like. A report may be made to the loading operator, for example, by causing all of the lamps 48A–48C in the external display lamp set 48 to flash.

If a report has been issued indicating that the halt position is unsuitable, then the loading operator waits without carrying out loading. Upon receiving this report, the truck operator moves the dump truck 11 to a flatter position (S39).

When the dump truck 11 has moved and halted, the process from S31 onwards is implemented again. Thereby, if it is judged that the halt position of the dump truck 11 is suitable (S33: YES), then a loading operation into the vessel 21 is started (S36).

The step S33 is now described in detail. If the equalizer bar 30 is not in an abutted state against the stopper 51, more specifically, if the dump truck 11 has been halted in a relatively flat position and the free rotation of the equalizer bar 30 is not limited, then the rear load F2 and the central load F1 will be approximately equal in step S33.

Therefore, as described above, by multiplying the rear load F2 by $(1+D2/D1)$, it is possible to determine the central load F1, and hence the total load of the rear load F2 and the central load F1 $(F1+F2)$ can be calculated. As described previously, in the present embodiment, since $D1=D2$, the total load can be determined simply by multiplying the rear load by two.

Here, at S33, since the loaded weight G is measured when the vessel 21 is empty, then provided that the halt position of the dump truck 11 is suitable, the overall value of the load after correction on the basis of the detection signal from the inclination sensor 20 (S19A) will be equal to the initial load. Therefore, the loaded weight will be approximately zero.

However, if the equalizer bar 30 is abutting against the stopper 51, then since the free rotation of the equalizer bar 30 is restricted, the rear load F2 and the central load F1 will not be equal, but rather, one will be greater than the other. Taking an extreme example, in a situation where the central wheels 18 are suspended in the air and the rear portion of the vehicle body 25 is supported by the rear wheels 19 only, the central load F1 will be approximately zero, and the rear load F2 will be double the load in a case where the dump truck 11 is halted in a suitable position.

Therefore, if free rotation is halted by the equalizer bar 30 abutting against the stopper 51, then it is not possible to calculate the total load accurately on the basis of the rear load F2 and hence a large error is produced in the measurement of the loaded weight.

At S33, since the loaded weight G is measured when the truck is empty, if the halt position (vehicle position) of the dump truck 11 is not suitable, then the loaded weight G will not assume a value in the vicinity of zero, but rather, it will substantially depart from the region of zero.

Therefore, at S33, if the loaded weight G does not lie within the prescribed range in the vicinity of zero (S33: NO), then it is judged that the halt position of the dump truck 11 is unsuitable. The lower limit G1 and the upper limit G2 which substantially limit the range of zero may be the same value or they may be different values.

Rather than judging whether or not the halt position of the dump truck 11 is suitable on the basis of the loaded weight G, it is also possible to make this judgment on the basis of the rear side load, for example. More specifically, a rear side load in an empty state is previously detected and stored, and the rear side load detected at step S33 is compared with this value. If the two values are substantially equal, or if the difference between these values is substantially zero, then it can be judged that the halt position of the dump truck 11 is suitable. Conversely, if the two values are different, or if the difference between the values exceeds a range of substantially zero, then it can be judged that the halt position of the dump truck 11 is unsuitable.

Alternatively, it is possible to judge whether or not the halt position of the dump truck 11 is suitable on the basis of the vertical component of the rear load or the total load.

According to the present embodiment as described above, it is previously judged whether or not the loaded weight can be measured accurately, before the loading operation, and if accurate measurement cannot be achieved, then this fact is reported respectively to the truck operator and loading operator situated inside and outside the dump truck 11. Thereby, since the loading operation can be started after the dump truck 11 has been halted in a suitable position, then it is possible to measure the loaded weight accurately.

Third Embodiment

Next, a third embodiment will be described on the basis of FIG. 12–FIG. 14. In this embodiment, as described hereinafter, a limit switch 50 is used in order to detect whether or not the equalizer bar 30 is abutted against the stopper 51.

In the second embodiment described above, it is judged whether or not the equalizer bar 30 is abutting against the stopper 51 when the dump truck 11 is halted in an empty state. However, the equalizer bar 30 may also become abutted against a stopper 51 in other circumstances, for instance, during loading, during travel or during unloading, and not only when the dump truck 11 is halted in an empty state. In these circumstances also, it is possible that error may occur in the measurement values for the loaded weight due to similar reasons to those described above.

Figure 12:
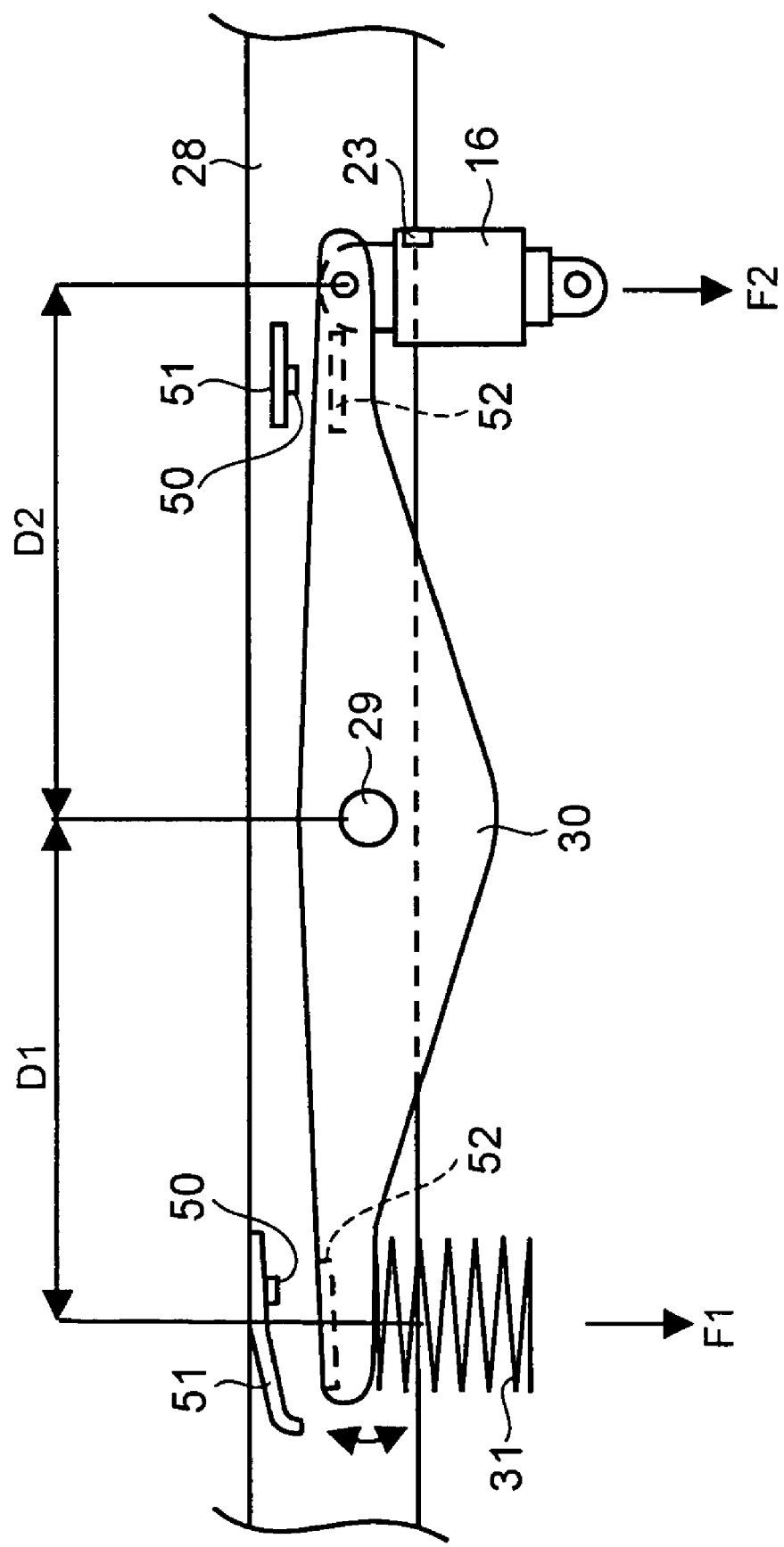
FIG. 12 is a side view of the vicinity of an equalizer bar relating to a third embodiment of the present invention.

In this embodiment, limit switches 50 are provided in order to detect whether or not the equalizer bar 30 is abutted against a stopper 51, as shown in FIG. 12. The limit switches 50 may be provided on the side of respective stoppers 51, for example. Alternatively, limit switches 50 may be provided respectively on bases 52.

The limit switch 50 may be constituted by a mechanical type limit switch in which an internal switch is actuated by the extension or contraction of a plunger, for example. Alternatively, for example, it may also be constituted by a proximity switch which detects the proximity of a physical body on the basis of change in a high-frequency magnetic field. Moreover, it is also possible to use a reflective type opto-electrical switch as the limit switch, for example. Furthermore, instead of the limit switch 50, a distortion gauge may be attached to at least one of the stopper 51 and the equalizer bar 30, and abutting may be detected on the basis of the signal from the distortion gauge.

In the following description, "abut" represents both a case where the base 52 of the equalizer bar 30 makes contact with a stopper 51 and a case where it approaches same to a position of near contact.

Figure 13:
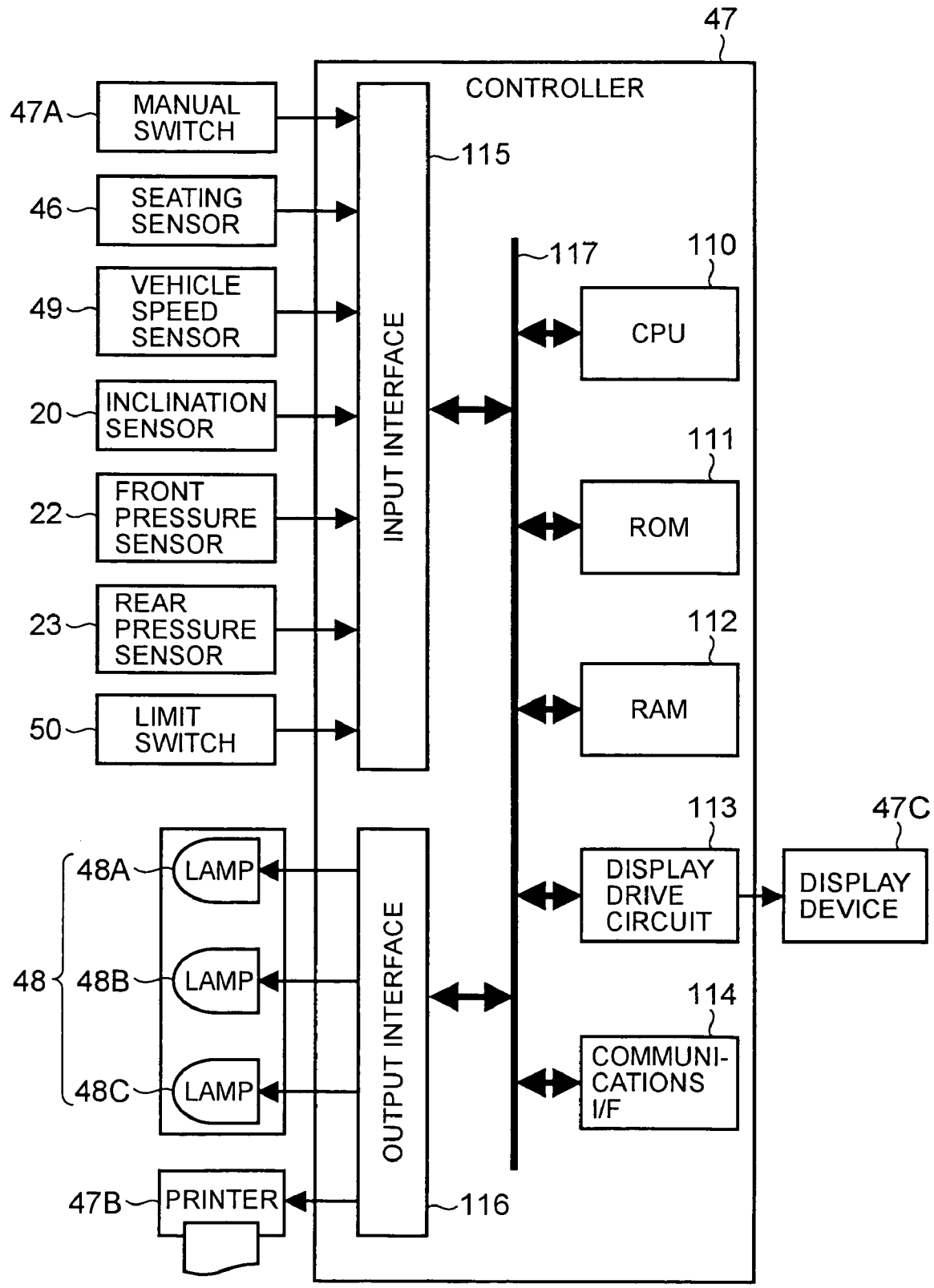
FIG. 13 is a block diagram showing the circuit structure of a controller.

As shown in the block diagram in FIG. 13, the signal from the limit switch 50 is input to the controller 47.

Figure 14:
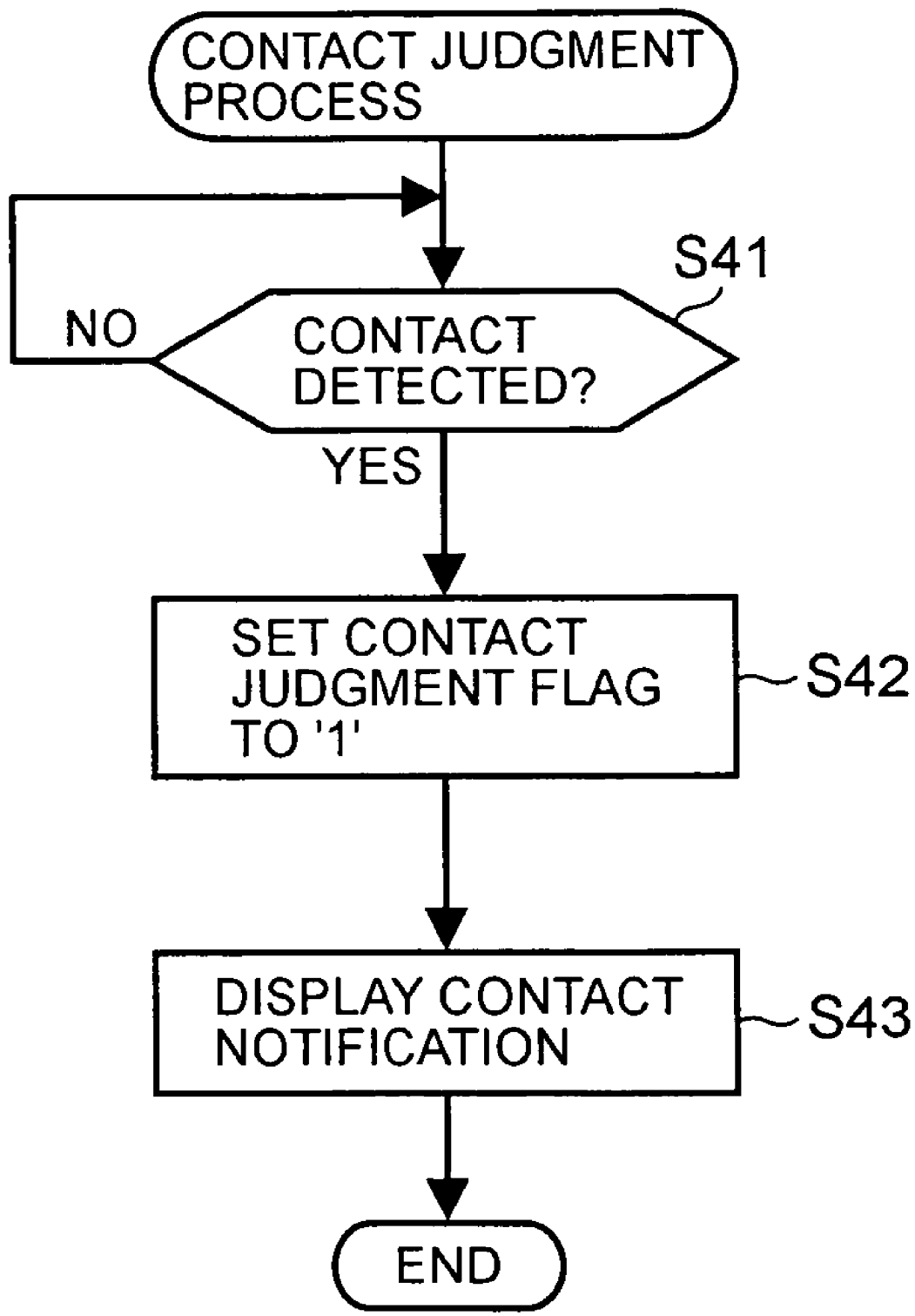
FIG. 14 is a flowchart of a process for judging whether or not an equalizer bar is abutted against a stopper.

FIG. 14 is a general flowchart of an abutment judgment process using a signal from a limit switch 50. The controller 47 monitors whether or not the equalizer bar 30 has abutted against a stopper 51, on the basis of signals from the limit switches 50 (S41). For example, the controller 47 is able to check the signal level of the limit switches 50 at prescribed short time periods. Alternatively, it is also possible to connect the signals from the limit switches 50 to an interrupt input terminal of the controller 47, an abutted state being detected by generation of an interrupt input.

If abutment of the equalizer bar 30 against a stopper 51 is detected by a limit switch 50 (S41: YES), then the controller 47 sets the abutment judgment flag to "1" (S42). This abutment judgment flag is stored in the storage section 250, and the various processes executed by the controller 47 reference this abutment judgment flag, either compulsorily or according to requirements. Alternatively, it is possible to omit the abutment judgment flag and to send an interrupt immediately to the programs being executed, when an abutted state between the equalizer bar 30 and the stopper 51 is detected.

The controller 47 reports to the operator that the equalizer bar 30 has abutted against the stopper 51 by displaying a prescribed warning message on the display device 47C, or by sounding a buzzer, for example. Furthermore, the controller 47 may issue a report to an externally situated loading operator, via the external display lamp set 48.

If the measured value of the loaded weight is displayed on the display device 47C, then the controller 47 is also able to display the fact that the equalizer bar 30 and the stopper 51 are abutting. For example, values for the loaded weight measured when these members are in an abutted state can be displayed in a red color or in a flashing manner, or the like, and hence it is possible readily to distinguish these values from other measurement values which were measured in a normal state.

Furthermore, if the measurement values for the loaded weight are output from the printer 47B, then the controller 47 may cause particular text or a particular symbol (for example, a "*" symbol) to be printed alongside loaded weight measurement values which were measured when the equalizer bar 30 and the stopper 51 were in an abutted state. In the case of a color printer, it is also possible to print measurement values that were measured in an abutted state, in a red color, or the like.

If the loaded weight is measured a plurality of times and an average value is determined, then the controller 47 is also able to exclude values measured when the equalizer bar 30 and the stopper 51 were in an abutted state, in such a manner that these values are not used in the process of calculating the average value. Alternatively, if an average value is calculated by using values that were measured in an abutted state and which have a possibility of containing measurement error, then the controller 47 is able to output information indicating the reliability of the average value (for example, text or a symbol such as "#") in association with the average value.

In this way, in the present embodiment, since a limit switch 50 is provided for detecting whether or not the equalizer bar 30 and the stopper 51 are in an abutted state, it is possible readily to judge whether or not accurate measurement of the loaded weight is possible, not only when the dump truck 11 is halted in an empty state, but also during loading into the vessel 21, during travel of the dump truck 11, and during unloading of the cargo from the vessel 21. Therefore operability is improved. More specifically, it is possible readily to distinguish the reliability of the measurement loaded weight values, even while the dump truck 11 is in various different modes (empty halted mode, loading mode, transporting mode, or unloading mode).

The present invention is not limited to the embodiments described above. A person skilled in the art may be able to make various additions and modifications within the scope of the present invention. For example, a case is described where one pressure sensor is provided respectively in each suspension cylinder, but the present invention is not limited to this and it is also possible to provide a plurality of pressure sensors respectively in each suspension cylinder.

Moreover, an example was given in which the central wheels are supported by springs and the rear wheels are supported by rear suspension cylinders, but the present invention may also be applied to a converse configuration in which the central wheels are supported by suspension cylinders and the rear wheels are supported by springs. Furthermore, a composition may be adopted in which both the central wheels and the rear wheels are supported respectively by suspension cylinders.

An articulated type dump truck was described as an example, but the present invention is not limited to this and may also be applied to a dump truck having a plurality of wheels supported by equalizer bars.

Furthermore, the present invention is not limited to a configuration where the central wheels and the rear wheels are coupled by equalizer bars, and it may also be applied to a configuration where the front wheels and the central wheels are coupled by equalizer bars. Moreover, the present invention may also be applied to a dump truck having a plurality of wheels coupled respectively by equalizer bars, in the front/rear direction of the vehicle.

What is claimed is:

1. A loaded weight measurement method for a dump truck comprising a set of equalizer bars respectively provided rotatably on the left and right-hand sides of a vehicle body; first vehicle wheels supported respectively by means of first suspension devices on one side of each equalizer bar; second vehicle wheels supported respectively by means of second suspension devices on the other side of each equalizer bar; and third vehicle wheels provided respectively on the left and right-hand sides of said vehicle body separately from said equalizer bars, and being supported respectively by means of third suspension devices, the loaded weight measurement method comprising:
   a first step of detecting a first load applied to either said first suspension device or said second suspension device;
   a second step of detecting a second load applied to said third suspension device;
   a third step of detecting an angle of inclination of said vehicle body; and
   a fourth step of calculating a loaded weight on the basis of said first and second loads detected respectively in said first and second steps, and said angle of inclination detected in said third step.

2. The loaded weight measurement method for a dump truck according to claim 1,
   wherein said fourth step comprises:
   a first sub-step of calculating a total load applied to said first and second suspension devices on the basis of the ratio between the respective distances from a center of rotation of at least one of said equalizer bars to said first and second suspension devices, and said first load detected in said first step;
   a second sub-step of respectively calculating a vertical load from said total load calculated in said first sub-step and said second load detected in said second step, on the basis of said angle of inclination detected in said third step; and
   a third sub-step of calculating said loaded weight by adding together a vertical component of said first load and a vertical component of said second load calculated in said second sub-step.

3. The loaded weight measurement method for a dump truck according to claim 1,
   wherein a judgment step for judging whether or not the equalizer bars are in a state of free rotation is executed prior to said first step, respective steps following said first step are executed if it is judged in said judgment step that said equalizer bars are in a state of free rotation, and a notification is reported if it is judged in said judgment step that said equalizer bars are not in a state of free rotation.

4. The loaded weight measurement method for a dump truck according to claim 3,
   wherein said judgment step judges whether or not said equalizer bars are in a state of free rotation on the basis of a detection signal from abutment detecting means for detecting an abutted state of said equalizer bars and said vehicle body.

5. The loaded weight measurement method for a dump truck according to claim 3,
   wherein said judgment step judges whether or not said equalizer bars are in said state of free rotation, by comparing at least one of said first load detected in an empty state in said first step and said loaded weight calculated in an empty state in said fourth step, with a previously established prescribed value for an empty state.

* * * * *